United States Patent [19]

Sauterey et al.

[11] Patent Number: 5,357,010
[45] Date of Patent: Oct. 18, 1994

[54] PROCESS FOR THE PREPARATION OF A POLYCHLOROPRENE POLYMER

[75] Inventors: Francois Sauterey, Chant/Sur/Drac; Paul Branlard, Lyon; Paul Poullet, Grenoble, all of France

[73] Assignee: Enichem Elastomeres France SA, Courbevoie, France

[21] Appl. No.: 22,836

[22] Filed: Feb. 25, 1993

Related U.S. Application Data

[63] Continuation of Ser. No. 899,129, Jun. 16, 1992, abandoned, which is a continuation of Ser. No. 622,142, Dec. 4, 1990, abandoned, which is a continuation of Ser. No. 334,713, Apr. 7, 1989, abandoned.

[30] Foreign Application Priority Data

Apr. 8, 1988 [FR] France .................. 88/04657

[51] Int. Cl.$^5$ ............................................ C08F 2/24
[52] U.S. Cl. .................................. 526/220; 526/223; 526/295
[58] Field of Search .................. 526/209, 220, 223

[56] References Cited

U.S. PATENT DOCUMENTS

| | | | |
|---|---|---|---|
| 3,190,865 | 6/1965 | Miller | 526/223 |
| 3,507,825 | 4/1970 | Paris . | |
| 4,180,638 | 12/1979 | Dollhausen | 526/204 |
| 4,255,539 | 3/1981 | Branlard | 526/220 |

FOREIGN PATENT DOCUMENTS 963075 7/1964 United Kingdom .

*Primary Examiner*—Christopher Henderson
*Attorney, Agent, or Firm*—Burns, Doane, Swecker & Mathis

[57] ABSTRACT

Polychloroprene polymers having stable viscosities and good scorch resistance, as well as excellent mechanical and dynamic properties in vulcanized state, are prepared by polymerizing chloroprene in alkaline aqueous emulsion, in the presence of a free-radical initiator and a combination chain-transfer agent including (1) at least one xanthogen disulfide and (2) at least one bis-(acylaminophenyl)polysulfide.

10 Claims, No Drawings

PROCESS FOR THE PREPARATION OF A POLYCHLOROPRENE POLYMER

CROSS-REFERENCE TO RELATED APPLICATIONS

The present application is a continuation of application Ser. No. 07/899,129, filed Jun. 16, 1992, abandoned; which is a continuation of application Ser. No. 07/622,142, filed Dec. 4, 1990, now abandoned; which is a continuation of application Ser. No. 07/334,713, filed Apr. 7, 1989, now abandoned.

BACKGROUND OF THE INVENTION

1. Field of the Invention

The present invention relates to the preparation of polychloroprene by polymerization of chloroprene in the presence of certain additives, as well as to the resulting polychloroprene itself, and mixtures of a vulcanizable rubber and a sol of a polychloroprene thus prepared.

2. Description of the Prior Art

It is known to this art to conduct the polymerization of chloroprene in the presence of a chain-transfer agent (for the control of molecular weight), such as a mercaptan or a xanthogen disulfide, optionally in combination with a minor amount of elemental sulfur. Polymerization in the presence of an alkylxanthogen disulfide results in the production of polychloroprenes, which, relative to the same polymers produced in the presence of mercaptans, have high mechanical properties, in particular tensile strength, but which are affected upon aging. Furthermore, polymers modified by a xanthogen disulfide present the disadvantage of premature vulcanization during downstream conversion stages, such as the molding of compositions containing same, resulting in undesirable scorching.

SUMMARY OF THE INVENTION

Accordingly, a major object of the present invention is the provision of improved polychloroprene polymers having a stable viscosity, improved scorch resistance and which are useful for the production of vulcanizates having excellent mechanical and dynamic properties.

Another object of this invention is the provision of an improved process for the preparation of such novel polymers by the polymerization of chloroprene in aqueous emulsion containing two judiciously selected chain-transfer agents, but practically no elemental sulfur, and which improved process conspicuously avoids, or at least ameliorates, those disadvantages and drawbacks to date characterizing the state of this art.

Briefly, the present invention features the preparation of polychloroprene by polymerizing chloroprene monomer, which may contain up to 30% by weight of an unsaturated comonomer copolymerizable therewith, in an alkaline aqueous emulsion and in the presence of a free-radical initiator and chain-transfer agents, and wherein such chain-transfer agents comprise (1) at least one xanthogen disulfide and (2) at least one bis-(acylaminophenyl)polysulfide.

DETAILED DESCRIPTION OF THE PREFERRED EMBODIMENTS OF THE INVENTION

More particularly according to the present invention, the xanthogen disulfides are well known molecular weight regulators having the general formula (I):

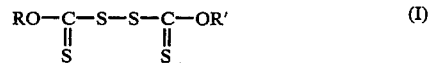

Preferred are those disulfides in which R and R′, which may be identical or different, are each alkyl radicals having from 1 to 8 carbon atoms. Representative such xanthogen disulfides are dimethylxanthogen disulfide, diethylxanthogen disulfide, diisopropylxanthogen disulfide, di-n-butylxanthogen disulfide, dicyclohexylxanthogen disulfide.

The bis(acylaminophenyl)polysulfides which serve as co-transfer agents during the polymerization according to the invention have the following general formula (II):

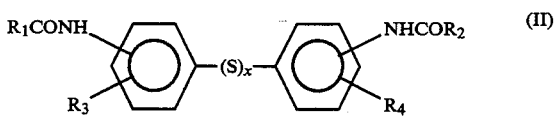

wherein $R_1$ and $R_2$, which may be identical or different, are each a linear or branched chain alkyl radical, or an aryl or arylalkyl radical, $R_3$ and $R_4$, which also may be identical or different, are each hydrogen, or a methyl or ethyl radical and x ranges from 2 to 4.

The $R_1$ and $R_2$ radicals are preferably $C_1$–$C_{12}$ alkyl radicals, or $C_6$–$C_{16}$ aryl or arylalkyl radicals, optionally substituted by one or more $C_1$–$C_4$ alkyl or alkoxy radicals, such as the phenyl, benzyl, benzhydryl, naphthyl, phenylethyl, phenylpropyl or methoxyphenyl radicals.

More preferred are the disulfides of general formula II in which $R_3$ and $R_4$ are hydrogen, and $R_1$ and $R_2$ are a phenyl radical (benzanilide disulfide) and, more particularly, bis(2-benzamido phenyl)disulfide, which is a commercially available product.

The polymerization is carried out according to conventional technique, in an alkaline aqueous emulsion in the presence of a chain-transfer agent.

The chloroprene may be homopolymerized, or it may be copolymerized with up to 30% of a comonomer that is copolymerizable with chloroprene and which contains at least one ethylenic double bond.

Exemplary comonomers copolymerizable with chloroprene are vinylaromatic compounds, such as styrene, vinyltoluenes and vinylnaphthalenes; acrylic and methacrylic acids, as well as the ester and nitrile derivatives thereof, such as ethyl acrylate, methyl methacrylate and acrylonitrile; aliphatic conjugated olefins, such as 1,3-butadiene, isoprene, 1-chlorobutadiene, 2,3-dichlorobutadiene and 2,3-dimethylbutadiene; and vinyl ethers and ketones, such as methylvinyl ether, vinyl acetate and methylvinyl ketone.

The monomer concentration in the aqueous emulsion is not critical; it generally ranges from 30% to 60% by weight of the total emulsion.

All conventional emulsifying agents and protective colloids may be used in the formulation of the chloroprene emulsion. Exemplary of such agents, the following are representative: water-soluble salts, in particular the sodium, potassium and ammonium salts of the following compounds: long chain fatty acids, colophony or the wood, pine or tall oil resins of colophony, partially polymerized, isomerized or dismutated colophony; fatty alcohol sulfates, alkyl sulfates and alkyl sulfonates; alkali metal salts of alkylaryl sulfonic acids; together with condensation products of formaldehyde with alkylaryl sulfonic acids, such as naphthalene sulfonic acid, and the condensates of ethylene oxide and phenols.

The pH of the emulsion preferably ranges from about 11 to 13.

As the free-radical initiators, peroxide compounds are particularly exemplary, such as alkali metal or ammonium persulfates, hydrogen peroxide, organic peroxides such as cumene peroxide, benzoyl peroxide and the alkali metal and ammonium ferricyanides.

The polymerization is advantageously carried out in an inert atmosphere in the absence of oxygen, at a temperature of from 0° to 80° and preferably from 10° to 50° C.

The chain-transfer agents according to this invention are typically introduced into the organic phase in their entirety, prior to the initiation of polymerization. Alternatively, it is possible to add these in fractions, whether simultaneously or successively during the polymerization, preferably prior to an approximately 50% conversion of the monomer.

The total amount of the transfer agents varies with the molecular weights of the compounds selected and their modification efficiency. For this reason, the proportion of compound (1) may be defined as the effective amount, expressed in diisopropylxanthogen disulfide, on the order of 0.01 to 0.8 parts and preferably from 0.07 to 0.50 parts per 100 parts by weight of the monomer or monomers. In the same manner, the proportion of compound (2) is defined as the effective amount, expressed in benzanilide disulfide, this amount being on the order of 0.01 to 1.3 parts, preferably 0.20 to 0.75 parts, per 100 parts by weight of the monomer or monomers. The preferred amount of diisopropylxanthogen disulfide and benzanilide disulfide ranges from 0.2 to 1 part per 100 parts by weight of the monomers. Equivalent amounts of other transfer agents may be determined by one skilled in this art by means of certain preliminary experiments and as a function of the desired Mooney viscosities, which generally range from 20 to 150.

Polymerization is interrupted when the degree of conversion of the monomers is preferably at least equal to 60%, by the addition of conventional polymerization inhibitors. Following the elimination of the residual monomer and the optional addition of antioxidants, the polychloroprene may be directly used in the latex stage, or isolated in known fashion, for example by precipitation with an electrolyte or by coagulation on a cold or steam heated drum, and then washed and dried.

The chloroprene polymers produced are characterized by the fact that they comprise a plurality of recurring monomer units terminated by a∼S-alkylxanthogen group and a plurality of recurring monomer units terminated by a∼S-acylaminophenyl group, the alkylxanthogen and acylaminophenyl radicals being radicals of the compounds of formulae (I) and (II). Preferably, the alkylxanthogen radical is isopropylxanthogen and the acylaminophenyl radical is 2-benzamidophenyl.

These polychloroprenes have a particularly stable Mooney viscosity under storage conditions. They may be vulcanized in conventional vulcanizing systems. The vulcanizable compositions are easily worked under greater safety conditions than the previously known polychloroprenes modified with xanthogen disulfide, whether or not in the presence of sulfur, with the vulcanizates thus produced having excellent mechanical and dynamic properties.

Among such vulcanizable compositions, sol type (soluble in benzene) chloroprene polymers are advantageously used in a mixture with chloroprene polymers of the gel type (insoluble in benzene) in view of their suitability for conversion, for example by extrusion under pressure through an appropriately shaped orifice. Sol/gel mixtures of this type are described, in particular, in U. S. Pat. Nos. 3,147,318 and 3,655,827 and in GB-A-1,148,690.

The present invention also features polychloroprene mixtures containing a chloroprene polymer sol and a chloroprene polymer gel, in a weight ratio of 95/5 to 25/75, which are characterized in that the polymer sol comprises a plurality of recurring monomer units terminated by a∼S-alkylxanthogen group and a plurality of recurring monomer units terminated by a∼S-acylaminophenyl group, as described above.

The polymer sol is advantageously prepared according to the process of the invention. To prepare the polymer gel, the polymerization of chloroprene may be carried out in aqueous emulsion in usual manner. The chloroprene may be polymerized, for example in the presence or absence of transfer agents, employing the same general techniques as for the production of a chloroprene sol, but by continuing the polymerization until a high degree of conversion, i.e., 90% to 100%, is attained. Another known and preferred method entails copolymerizing the chloroprene with a comonomer containing at least two polymerizable double bonds. Exemplary such comonomers are, in particular, divinylbenzene and methacrylic acid esters of polyhydroxyl compounds, such as alkyleneglycols, trimethylolpropane and dihydroxybenzene. Whatever the particular mode of preparation, it is possible to replace a fraction of the chloroprene, up to about 30%, by a conventional ethylenically unsaturated comonomer.

The mixture of the chloroprene polymer sol and chloroprene polymer gel is preferably prepared by mixing the latexes, followed by separation by the usual techniques, such as coagulation by freezing. However, it is possible to mix the isolated polymers individually by mechanical means, such as grinding or kneading.

The mixture of polymer sol/gels is used in vulcanizable compositions, which, relative to mixtures in which the polymer sol has been modified by an alkylxanthogen disulfide alone, have a lesser tendency to scorch and swell during extrusion.

In order to illustrate the present invention and the advantages thereof, the following specific examples are given, it being understood that same are intended only as illustrative and in nowise limitative.

In said examples to follow, all parts and percentages are given by weight, unless otherwise indicated.

EXAMPLE 1

Into a polymerization vessel were charged the following materials:

|  | Parts by weight |
|---|---|
| Chloroprene | 100 |
| Diisopropylxanthogen disulfide | 0.20 |
| Benzanilide disulfide (PEPTON 22) | 0.50 |
| Water | 110 |
| Dismutated rosin (Resine 731D ® marketed by Hercules) | 3 |
| Sodium hydroxide | 0.60 |
| Sodium salt of formaldehyde/naphthalene sulfonic acid condensate (DAXAD 15 ® marketed by W. R. Grace) | 0.50 |

Polymerization was carried out at 40° C. under a nitrogen atmosphere, at pH 12.5, by introducing, at a suitable rate, an initiator comprising an aqueous solution of 2.5% sodium persulfate and 2% sodium dithionate.

Polymerization was stopped at a degree of conversion of 67% by the addition of a chloroprene emulsion containing 0.01 part t-butylcatechol and 0.003 part of phenothiazine.

The residual monomer was then eliminated by steam entrainment and the polychloroprene was isolated by coagulating the latex, adjusted to pH 5.5, on a drum cooled to −20° C. The resulting film was washed and dried.

The polymer obtained had an initial Mooney viscosity (ML 1+4 at 100° C.) of 53.

The variations in Mooney viscosity (ML 1+4 at 100° C.) of the rubber stored in an oven at 70° C. were the following:

| ML 1 + 4 - 100° C. after | 24 h + 1 |
|---|---|
|  | 48 h + 1 |
|  | 72 h + 2 |

EXAMPLE 2 (Comparative example)

The following materials were charged into a polymerization:

|  | Parts by weight |
|---|---|
| Chloroprene | 100 |
| n-dodecylmercaptan | 0.23 |
| Water | 90 |
| Dismutated rosin (Resine 731D ® marketed by Hercules) | 3 |
| Sodium hydroxide | 0.60 |
| Sodium salt of formaldehyde/naphthalene sulfonic acid condensate (DAXAD 15 ® marketed by W. R. Grace) | 0.50 |

Polymerization was carried out at 40° C. under a nitrogen atmosphere at a pH of 12.5, by regulating a suitable flow of an initiator comprising an aqueous solution containing 0.5% sodium persulfate and 5% sodium dithionate.

Polymerization was stopped at a degree of conversion of 67% by the addition of a chloroprene emulsion containing 0.01 part t-butylcatechol and 0.003 part phenothiazine.

The residual monomer was then eliminated by steam entrainment and then the polychloroprene was separated by the coagulation of the latex at pH 6.5 on a drum cooled to −20° C. The resulting film was washed and dried.

The polymer obtained had a Mooney viscosity (ML 1+4 at 100° C.) of 46.

EXAMPLE 3 (Comparative example)

The following materials were charged into a polymerization vessel:

|  | Parts by weight |
|---|---|
| Chloroprene | 100 |
| Diisopropylxanthogen disulfide | 0.67 |
| Water | 110 |
| Dismutated rosin (Resine 731D ® marketed by Hercules) | 3 |
| Sodium hydroxide | 0.60 |
| Sodium salt of formaldehyde/naphthalene sulfonic acid condensate (DAXAD 15 ® marketed by W. R. Grace) | 0.50 |

Polymerization was carried out at 40° C. under a nitrogen atmosphere at pH 12.5, by regulating a suitable flow rate of an initiator comprising an aqueous solution containing 2.5% of sodium persulfate and 2% sodium dithionate.

Polymerization was stopped at a degree of conversion of 67% by the addition of a chloroprene emulsion containing 0.01 part of t-butylcatechol and 0.003 part phenothiazine.

The residual monomer was eliminated by steam entrainment and the polychloroprene separated by coagulation of the latex at pH 6.5 on a drum cooled to −20° C. The resulting film was washed and dried.

The polymer obtained had a Mooney viscosity (ML 1+4 at 100° C.) of 46.

EXAMPLES 4 TO 9

Polychloroprenes were prepared under the conditions described in Example 1 from the same emulsion system and by varying the proportion of the transfer agents as follows:

| Examples | Diisopropylxanthogen | Benzanilide disulfide |
|---|---|---|
| 4 | 0.40 | 0.30 |
| 5 | 0.035 | 0.70 |
| 6 | 0.08 | 0.22 |
| 7 | 0.22 | 0.22 |
| 8 | 0.48 | 0.22 |
| 9 | 0.15 | 0.40 |

The changes in the Mooney viscosity of the rubber obtained and stored at 70° C. were as follows:

TABLE 1

| MOONEY VISCOSITY ML 1 + 4 at 100° C. | INITIAL | At 70° C. after | | |
|---|---|---|---|---|
|  |  | 24 h | 48 h | 72 h |
| Ex. 4 | 54 | 55 | 55 | 56 |
| Ex. 5 | 51 | 52 | 53 | 53 |
| Ex. 6 | 141 | 141 | 142 | 145 |
| Ex. 7 | 107 | 107 | 107 | 109 |
| Ex. 8 | 37 | 37 | 37 | 36 |
| Ex. 9 | 67 | 67 | 67 | 67 |

The polychloroprenes prepared according to Examples 1 to 5 were evaluated with respect to their working and their mechanical and dynamic properties.

DEGRADATION DURING WORKING

The difference in the Mooney consistency ML 1+4 of the polymer before and after kneading was measured under the following conditions:

Experiment A

The polymer was worked, firstly, on open cylinders, according to the ISO 1796 standard.

Secondly, the kneaded rubber was introduced into a BRABENDER chamber at 40° C. (speed of blade: 80 rpm).

After 10 min of kneading, the Mooney consistency (ML 1+4 at 100° C.) was measured according to ISO standard 289.

Experiment B

Experiment A was repeated by incorporating, after 30 sec on the BRABENDER, 1 part diorthotolylguanidine per 100 parts of the polymer. The results are reported in Table 2:

TABLE 2

| EXAMPLES | ML 1 + 4 - 100° C. initial | ΔML 1 + 4 - 100° C. after 10 min kneading Experiment A | ΔML 1 + 4 - 100° C. after 10 min kneading Experiment B |
|---|---|---|---|
| 1 | 53 | −20 | −12 |
| 2 | 46 | −6 | −7 |
| 3 | 46 | −13 | +33 |
| 4 | 54 | −20 | −7 |
| 5 | 51 | −18 | −14 |

The polymers of Examples 1, 4 and 5 according to the invention degrade further. Their workability was thus improved relative to the polymers of the prior art. The working was especially improved, if formulation ingredients such as guanidine derivatives were added, which are known scorching agents.

Mechanical and Dynamic Properties of Vulcanizates

The polymers of Examples 1 to 5 were mixed according to the following formulations:

|  | Parts by weight: |
|---|---|
| Formulation A: |  |
| Polychloroprene | 100 |
| Magnesium oxide | 4 |
| Zinc oxide | 5 |
| Stearic acid | 0.5 |
| Phenyl-β-naphthylamine | 2 |
| Carbon black N 660 | 30 |
| Ethylene thiourea (MIXLAND 75 ® marketed by French MLPC Co.) | 0.67 |
| Formulation B: |  |
| Polychloroprene | 100 |
| Magnesium oxide | 4 |
| Zinc oxide | 5 |
| Stearic acid | 0.5 |
| Substituted p-phenylene diamine (Wingstay 100 ® marketed by Goodyear) | 1 |
| Carbon black N 660 | 30 |
| Tetramethylthiuram monosulfide | 1 |
| Diorthotolylguanidine | 1 |
| Sulfur | 1 |

Each formulation was vulcanized at 153° C. for 40 min. The properties of the vulcanizates were measured according to the following standards:

| Scorching (120° C.) | ISO 667 standard |
|---|---|
| MAXI MONSANTO at 153° C. | ISO 3417 |
| Tensile strength | ISO 37 |
| Modulus, 300% | ISO 37 |
| Elongation at break | ISO 37 |
| Compression set after | ISO 815 |
| 96 h at 100° C. | |

Dynamic properties=tests were carried out on specimens prepared according to ISO 133.

The results are expressed in numbers of kilocycles to obtain 50 and 100% propagation of a notch of an initial length of 2 mm relative to the total length of the specimen.

The results are reported in Tables 3 and 4:

TABLE 3

Properties of vulcanizates: Formulation A:

|  | EXAMPLES | | | | |
|---|---|---|---|---|---|
|  | 1 | 2 | 3 | 4 | 5 |
| Mooney ML 1 + 4 100° C. of mixture | 82 | 74 | 78 | 83 | 81 |
| Scorching 120° C. min/Δ 10 points | 13.5 | 10 | 10 | 13.5 | 14 |
| Mechanical properties |  |  |  |  |  |
| Maxi MONSANTO | 89 | 86 | 114 | 110 | 79 |
| Tensile resistance | 22.7 | 19.7 | 21.4 | 21.8 | 22.6 |
| Modulus 300% MPa | 14 | 12.9 | 16.2 | 16.5 | 12 |
| Compression set % | 33 | 30 | 29 | 29 | 35 |
| Tear strength k N/m |  |  |  |  |  |
| Notch 2 mm | 23 | 24 | 21 | 24 | 26 |
| Notch 0.5 mm | 56 | 57 | 50 | 56 | 57 |
| Dynamic properties, No. of kilocycles |  |  |  |  |  |
| Propagation, 50% | 10,000 | 6,000 | 2,000 | 2,000 | 300,000 |
| Propagation, 100% | 300,000 | 80,000 | 9,000 | 10,000 | >10$^6$ |

TABLE 4

Properties of vulcanizates: Formulation B:

|  | EXAMPLES | | | | |
|---|---|---|---|---|---|
|  | 1 | 2 | 3 | 4 | 5 |
| Mooney ML 1 + 4 100° C. of mixture | 65 | 61 | 68 | 73 | 65 |
| Scorching 120° C. min/Δ 10 points | 26.2 | 33.5 | 28.5 | 24.7 | 28.5 |
| Mechanical properties |  |  |  |  |  |
| Maxi MONSANTO | 95.5 | 94 | 106 | 103 | 90 |
| Tensile resistance | 24 | 22.4 | 22.8 | 23.8 | 23.2 |
| Modulus 300% MPa | 12.1 | 12.4 | 13.4 | 13.1 | 11.8 |
| Compression set % | 59 | 61 | 62 | 63 | 57 |
| Tear strength k N/m |  |  |  |  |  |
| Notch 2 mm | 54 | 48 | 44 | 48 | 56 |
| Notch 0.5 mm | 24 | 23 | 21 | 21 | 25 |
| Dynamic properties, No. of kilocycles |  |  |  |  |  |
| Propagation, 50% | 8,000 | 3,500 | 2,000 | 3,000 | 10,000 |
| Propagation, 100% | 100,000 | 20,000 | 8,000 | 10,000 | 200,000 |

EXAMPLE 10

Mixture of a Polymer Sol and Polymer Gel

Preparation of the Polymer Sol

Polymer 10A—A polychloroprene latex was prepared according to the invention as indicated in Example 1.

The initial Mooney (ML 1+4—100° C.) viscosity of a specimen separated from the latex by coagulation and dried, was 51.

Polymer 10B—As a comparison, a polychloroprene latex modified with xanthogen was prepared as in Example 3, but using 0.50 parts of diisopropylxanthogen disulfide per 100 parts chloroprene. The initial Mooney viscosity of a specimen separated from the latex was 54.

Production of the Polymer Gel (Polymer 10C)

The following materials were charged into a polymerization vessel:

|  | Parts by weight |
|---|---|
| Chloroprene | 100 |
| Diethyleneglycol dimethacrylate | 2 |
| Water | 100 |
| Dismutated rosin (Resine 731D ®) | 3.5 |
| Sodium hydroxide | 0.60 |
| Sodium salt of formaldehyde/naphthalene sulfonic acid condensate (DAXAD 15 ®) | 0.50 |

Polymerization was carried out at 45° C. under a nitrogen atmosphere at pH 12.5 by regulating a suitable flow of an initiator comprising a 2.5% aqueous solution of sodium persulfate and 2% sodium dithionate.

When 98% of the monomer had been converted into polymer, polymerization was stopped by the addition of a chloroprene emulsion containing 0.01 part t-butylcatechol and 0.003 parts phenothiazine.

Preparation of the Sol/gel Mixture

In the latex stage, 80 parts of a polymer soluble in benzene were mixed with 20 parts of a polymer insoluble in benzene, and the polymer mixture was separated from the latex.

The sol/gel polymers obtained were then mixed according to the above-described formulation and vulcanized at 153° C. for 40 min.

The properties of the vulcanizates were tested according to the standards described above. The results are reported in Table 5.

EXAMPLE 11

The following materials were charged into a polymerization vessel:

|  | Parts by weight |
|---|---|
| Chloroprene | 100 |
| Diisopropylxanthogen disulfide | 0.20 |
| Benzanilide disulfide (PEPTON 22) | 0.30 |
| Water | 110 |
| Dismutated rosin (Resine 731D ® marketed by Hercules) | 3 |
| Sodium hydroxide | 0.60 |
| Sodium salt of formaldehyde/naphthalene sulfonic acid condensate (DAXAD 15 ® marketed by W. R. Grace) | 0.50 |

Polymerization was carried out at 45° C. under nitrogen at pH 12.5 by regulating a suitable flow of an initiator comprising an aqueous solution containing 2.5% of sodium persulfate and 2% sodium dithionate.

Polymerization was stopped at a degree of conversion of 64% by the addition of a chloroprene emulsion containing 0.01 part t-butylcatechol and 0.003 part phenothiazine, after which the residual monomer was eliminated by entrainment in steam.

The initial Mooney (ML 1+4—100° C.) viscosity of the separated polymer was 90.

EXAMPLE 12 (Comparative example)

The following materials were charged into a polymerization vessel:

|  | Parts by weight |
|---|---|
| Chloroprene | 100 |
| Diisopropylxanthogen disulfide | 0.28 |
| Water | 90 |
| Dismutated rosin (Resine 731D ® marketed by Hercules) | 3 |
| Sodium hydroxide | 0.50 |
| Sodium salt of formaldehyde/naphthalene sulfonic acid condensate (DAXAD 15 ® marketed by W. R. Grace) | 0.50 |

The polymerization was carried out at a temperature of 45° C., under nitrogen at a pH of 12.5 by regulating a suitable flow of an initiator comprising an aqueous solution containing 2.5% of sodium persulfate and 2% of sodium dithionate.

Polymerization was stopped at a degree of conversion of 70% by the addition of a chloroprene emulsion containing 0.01 part t-butylcatechol and 0.003 part phenothiazine.

The initial Mooney (ML 1+4—100° C.) viscosity of the separated polymer was 84.

EXAMPLE 13

Sol/gel Mixture

In the latex stage, 90 parts of the polymer soluble in benzene obtained according to Examples 11 and 12 were mixed with the polymer insoluble in benzene obtained in Example 10C. The polymer mixture was then separated from the latex.

The polymers were then mixed with the following components in the usual manner:

|  | Parts by weight |
|---|---|
| Polychloroprene | 100 |
| Magnesium oxide | 4 |
| Zinc oxide | 5 |
| Stearic acid | 0.5 |
| Phenyl-β-naphthylamine | 2 |
| Carbon black N 660 | 75 |
| Aromatic oil 729FC (Shell) | 30 |
| Ethylene thiourea | 0.67 |

This formulation was vulcanized at 153° C. for 40 min. The properties of the vulcanizates are reported in Table 5.

TABLE 5

| Sol/gel | Formulation A Mixture 80/20 | | Formulation B Mixture 90/10 | |
|---|---|---|---|---|
|  | 10A/10C | 10B/10C | 11/10C | 12/10C |
| MOONEY Compound Scorching at 153° C. | 93 | 99 | 75 | 78 |
| min Δ 10 pts | 8.75 | 6.75 | 11 | 9 |
| Δ 35 pts | 12.5 | 9.75 | 16 | 11.25 |
| MONSANTO |  |  |  |  |
| maxi | 93 | 118 | 97 | 108 |
| min. + 10 | 3.5 | 3 | 5 | 3 |
| min. + 30 | 6.25 | 4.5 | 9 | 5.5 |
| min. optimum | 16 | 23.5 | 25 | 23 |
| Tensile strength MPa | 22.3 | 20.6 | 17 | 20 |
| Elongation at break % | 395 | 375 | 250 | 260 |
| Modulus MPa |  |  |  |  |
| 200% | 7.8 | 9.9 | 12 | 14.8 |
| 300% | 14.8 | 18.3 | 14.1 | 18.8 |
| Extrusion |  |  |  |  |
| Flow ml/min. | 15.1 | 14.5 | 18 | 17.3 |
| Swelling at die | 76 | 91 | 31 | 52.2 |

TABLE 5-continued

| | Formulation A Mixture 80/20 | | Formulation B Mixture 90/10 | |
|---|---|---|---|---|
| Sol/gel | 10A/10C | 10B/10C | 11/10C | 12/10C |
| Appearance | smooth | smooth | smooth | smooth |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a polychloroprene polymer, comprising polymerizing chloroprene in alkaline aqueous emulsion, in the presence of a free-radical initiator and a combination chain-transfer agent, said combination chain-transfer agent comprising an effective amount of (1) at least one xanthogen disulfide and (2) at least one bis(acylaminophenyl)-polysulfide for forming a polychloroprene polymer, said polymerization being carried out without elemental sulfur and wherein the at least one xanthogen disulfide has a formula according to Formula (I) and the at least one bis(acylaminophenyl)-polysulfide has a formula according to Formula (II):

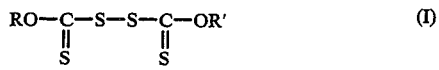

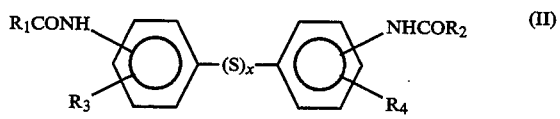

wherein R and R', which may be identical or different, are each alkyl radicals having from 1 to 8 carbon atoms; $R_1$ and $R_2$, which may be identical or different, are each a linear or branched chain alkyl radical, an aryl radical or an arylalkyl radical, $R_3$ and $R_4$ which are identical or different, are each hydrogen, a methyl radical, or ethyl radical; and x ranges from 2 to 4.

2. The process as defined by claim 1, said combination chain-transfer agent comprising (2) at least one benzanilide disulfide.

3. The process as defined by claim 1, said combination chain-transfer agent comprising (2) at least one bis(2-benzamidophenyl)polysulfide.

4. The process as defined by claim 1, wherein the amount of said at least one xanthogen disulfide (1) ranges from 0.01 to 0.8 parts by weight, expressed as diisopropylxanthogen disulfide, per 100 parts by weight of polymerizable monomer.

5. The process as defined by claim 4, said amount of said at least one xanthogen disulfide ranging from 0.07 to 0.50 parts by weight, per 100 parts by weight of polymerizable monomer.

6. The process as defined by claim 4, wherein the amount of said at least one bis(acylaminophenyl)polysulfide (2) ranges from 0.01 to 1.3 parts by weight, expressed as benzanilide disulfide, per 100 parts by weight of polymerizable monomer.

7. The process as defined by claim 6, said amount of said at least one bis(acylaminophenyl)polysulfide ranging from 0.20 to 0.75 parts by weight, per 100 parts by weight of polymerizable monomer.

8. The process as defined by claim 6, wherein the total amount of said at least one xanthogen disulfide (1) and said at least one bis(acylaminophenyl)polysulfide (2) ranges from 0.2 to 1 part by weight, per 100 parts by weight of polymerizable monomer.

9. The process as defined by claim 1, comprising homopolymerizing chloroprene monomer.

10. The process as defined by claim 1, comprising copolymerizing chloroprene with up to 30% by weight of an ethylenically unsaturated comonomer copolymerizable therewith.

* * * * *